(12) United States Patent
Nakanishi et al.

(10) Patent No.: US 9,039,096 B2
(45) Date of Patent: May 26, 2015

(54) VEHICLE SEAT

(71) Applicant: TOYOTA BOSHOKU KABUSHIKI KAISHA, Aichi-ken (JP)

(72) Inventors: Masashi Nakanishi, Aichi (JP); Hiroyuki Hayashi, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/056,146

(22) Filed: Oct. 17, 2013

(65) Prior Publication Data
US 2014/0110987 A1    Apr. 24, 2014

(30) Foreign Application Priority Data

Oct. 19, 2012   (JP) ................................ 2012-231800

(51) Int. Cl.
| | | |
|---|---|---|
| A47D 15/00 | (2006.01) | |
| B60R 22/00 | (2006.01) | |
| B60R 22/18 | (2006.01) | |
| B60R 22/26 | (2006.01) | |

(52) U.S. Cl.
CPC ................ *B60R 22/00* (2013.01); *B60R 22/18* (2013.01); *B60R 22/26* (2013.01); *B60R 2022/1818* (2013.01)

(58) Field of Classification Search
CPC ..................... B60R 22/024; B60R 2022/1818
USPC ................................................. 297/481, 482
See application file for complete search history.

(56) References Cited

U.S. PATENT DOCUMENTS

| | | | | | |
|---|---|---|---|---|---|
| 3,740,094 | A | * | 6/1973 | Hornyak | 297/481 |
| 4,648,625 | A | * | 3/1987 | Lynch | 280/808 |
| 4,741,557 | A | * | 5/1988 | Jambor et al. | 297/481 X |
| 5,080,396 | A | * | 1/1992 | Vacanti | 280/808 |
| 5,135,257 | A | * | 8/1992 | Short | 280/808 |
| 5,139,311 | A | * | 8/1992 | Imai et al. | 297/481 |
| 5,308,116 | A | * | 5/1994 | Zawisa et al. | 280/808 |
| 5,570,933 | A | * | 11/1996 | Rouhana et al. | 297/483 |
| 5,797,654 | A | * | 8/1998 | Stroud | 297/483 |
| 5,931,503 | A | * | 8/1999 | Glendon | 280/808 |
| 6,412,876 | B2 | * | 7/2002 | Nishide | 297/481 X |
| RE37,942 | E | * | 12/2002 | Glendon | 280/808 |
| 7,104,570 | B2 | * | 9/2006 | Hearn et al. | 297/481 X |
| 7,314,235 | B2 | * | 1/2008 | Downey | 280/808 |
| 7,513,532 | B1 | * | 4/2009 | Vaughns et al. | 280/808 |
| 7,971,908 | B2 | * | 7/2011 | Hathaway et al. | 280/808 |
| 7,980,635 | B2 | * | 7/2011 | Matsushita | 297/481 X |
| 8,308,244 | B2 | * | 11/2012 | Parker et al. | 297/481 |
| 8,740,309 | B2 | * | 6/2014 | Kajihara | 297/481 |
| 2014/0110988 | A1 | * | 4/2014 | Nakanishi et al. | 297/481 |

FOREIGN PATENT DOCUMENTS

JP        2003-2161      1/2003

* cited by examiner

*Primary Examiner* — Rodney B White
(74) *Attorney, Agent, or Firm* — Greenblum & Bernstein, P.L.C.

(57) ABSTRACT

A vehicle seat includes a seat cushion, a seat back connected to the seat cushion and including a storage portion, a belt member configured to restrain an occupant while the belt member is routed from a side of the seat back to a side of the seat cushion, and a rerouter member configured to be taken out from the storage portion of the seat back and connected to the belt member to change a routing position of the belt member at a middle portion thereof. In a state where a portion of the rerouter member is stored in the storage portion, another portion of the rerouter member is exposed from the storage portion.

6 Claims, 4 Drawing Sheets

VEHICLE SEAT

BACKGROUND OF THE INVENTION

1. Field of the Invention

The present invention relates to a vehicle seat that includes a belt member configured to restrain an occupant, and a rerouter member configured to change a routing position of the belt member.

2. Description of the Related Art

JP-A-2003-2161 discloses a vehicle seat including a seat cushion, a seat back, a belt member, and a belt guide member.

The belt member is a band-shaped belt that is configured to restrain an occupant, and can be drawn from a door unit adjacent to the vehicle seat. In addition, the belt guide member is a member having a ring shape into which the belt member can be inserted, and is attached to a shoulder portion of the seat back and always exposed. The seat back is connected to the seat cushion to be movable between an upright position and a reclining position, and disposed close to the door unit. The belt member is made to pass through the belt guide member while being drawn from the door unit, and is routed from the seat back toward the seat cushion.

After an occupant is seated on a seating side of the vehicle seat, an end portion of the belt member is locked with a seat cushion side (a buckle member) while the belt member is wound around the occupant. Thus, the seated occupant can be restrained with the belt member.

Incidentally, in the above-descried seat configuration, it is desired to appropriately change a routing position of the belt member depending on a body size or the like of an occupant.

For example, the belt guide member may be made movable from the shoulder portion of the seat back to the front side of the seat (the belt guide member is made usable as a rerouter member). While belt guide member is appropriately moved, the belt member can be set apart from the seating side to be loosen (is set close to the seating side to be fasten). Accordingly, the occupant can be favorably restrained with the belt member in accordance with the difference in body sizes.

SUMMARY OF THE INVENTION

In the meantime, in the above-described configuration, the belt guide member (rerouter member) is always exposed, and therefore, this configuration is not proactively employed in view of design of the seat.

Although the belt guide member (rerouter member) could be stored completely inside the seat, this turns out the belt guide member being not recognized at first glance (i.e., this is a configuration inferior in usability).

The present invention has been made in view of the above circumstances, and an object of the present invention is to provide a vehicle seat which avoids deterioration of design of the vehicle seat as much as it can be, and disposes a rerouter member to have better usability.

According to an illustrative embodiment of the present invention, there is provided a vehicle seat comprising: a seat cushion; a seat back connected to the seat cushion and including a storage portion; a belt member configured to restrain an occupant while the belt member is routed from a side of the seat back to a side of the seat cushion; and a rerouter member configured to be taken out from the storage portion of the seat back and connected to the belt member to change a routing position of the belt member at a middle portion thereof, wherein in a state where a portion of the rerouter member is stored in the storage portion, another portion of the rerouter member is exposed from the storage portion.

According to the above configuration, the rerouter member is partially exposed while storing the rerouter member in the storage portion, so that deterioration of design can be avoided as much as it can be, and the rerouter member can be disposed to have better usability.

In the above vehicle seat, the storage portion may be provided on a seating surface or a side surface of the seat back. According to this configuration, the rerouter member can be relatively quickly found.

In the above vehicle seat, the rerouter member may be configured to be taken out from an take-out opening provided on an upper portion of the storage portion in a state where the seat back is at an upright position with respect to the seat cushion.

According to this configuration, the rerouter member can be easily inserted and taken out.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Hereinafter, a detailed description of illustrative embodiments of the present invention will be provided with reference to FIGS. 1 to 5. In each of the drawings, a mark F is provided on the front side of a vehicle seat, a mark B is provided on the back side of the vehicle seat, a mark UP is provided on the upper side of the vehicle seat, and a mark DW is provided on the lower side of the vehicle seat.

Figure 1:
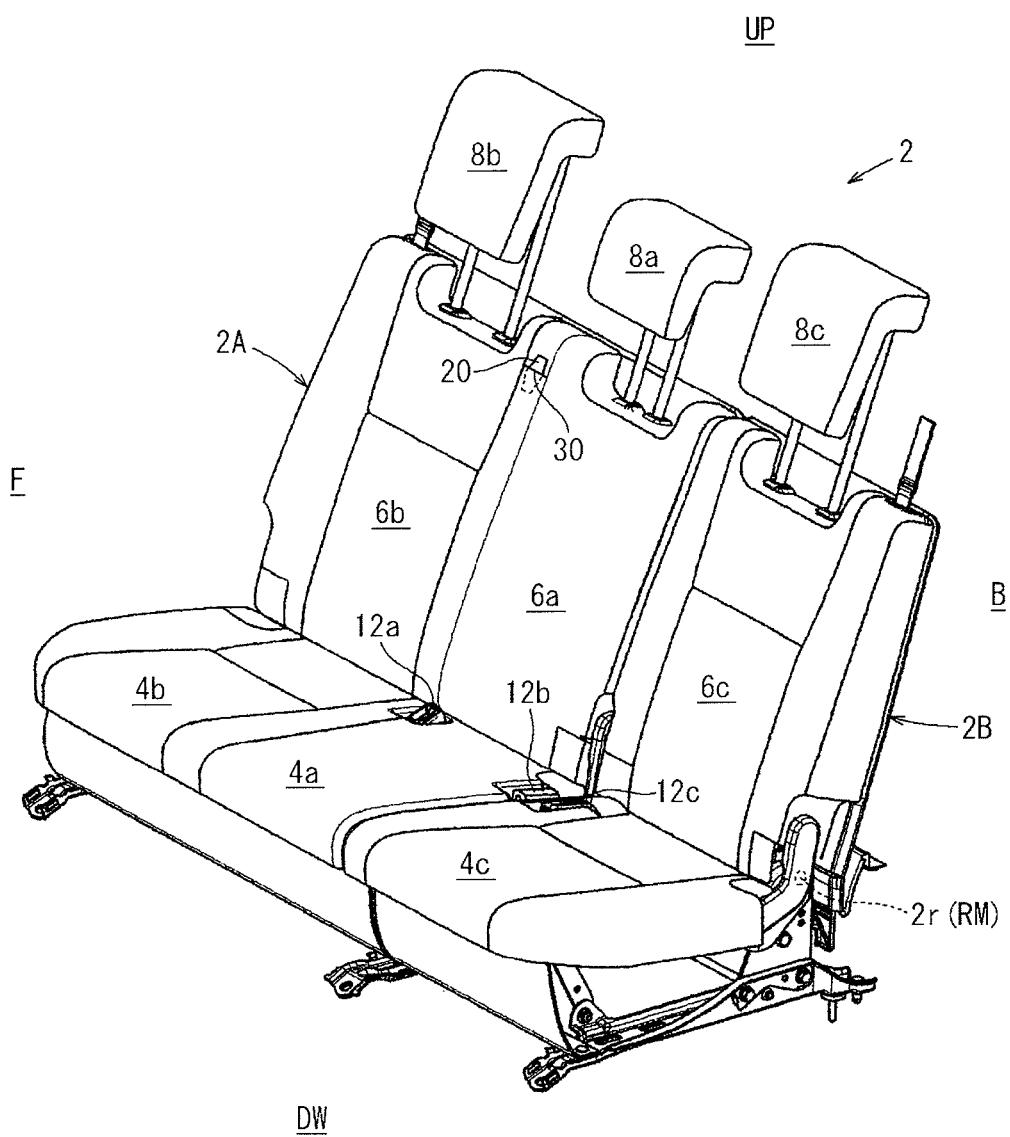
FIG. 1 is a perspective view of a vehicle seat.

Referring to FIG. 1, a vehicle seat 2 includes a first seat section 2A and a second seat section 2B, and is capable of receiving a plurality of occupants.

The first seat section 2A defines a section that is relatively large in width (a large-sized section), and includes a plurality of sets of seat constructional members (seat cushions 4a and 4b, seat backs 6a and 6b, and head rests 8a and 8b). The second seat section 2B defines a section that is relatively small in width (a small-sized section), and includes a single set of seat constructional members (a seat cushion 4c, a seat back 6c, and a head rest 8c).

Figure 4:
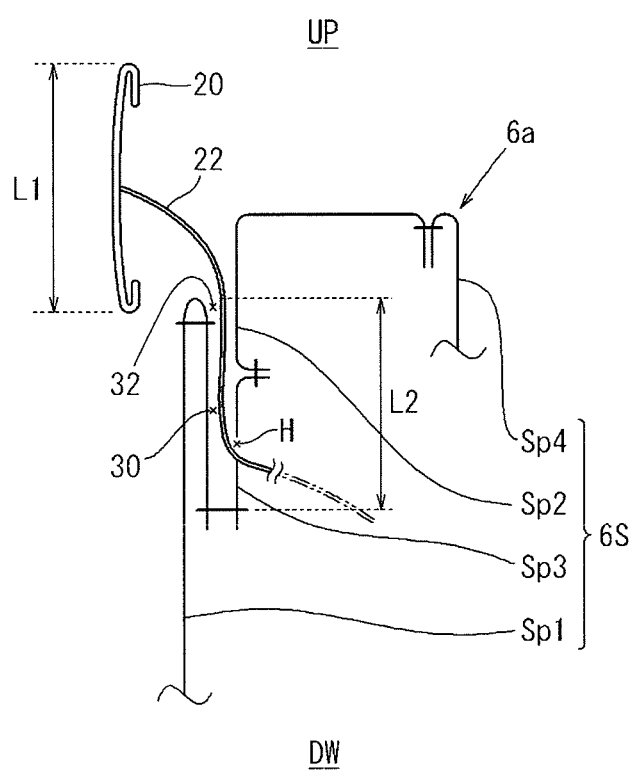
FIG. 4 is a partial cross-sectional view of the seat back taken along the line IV-IV of FIG. 3.
Figure 5:
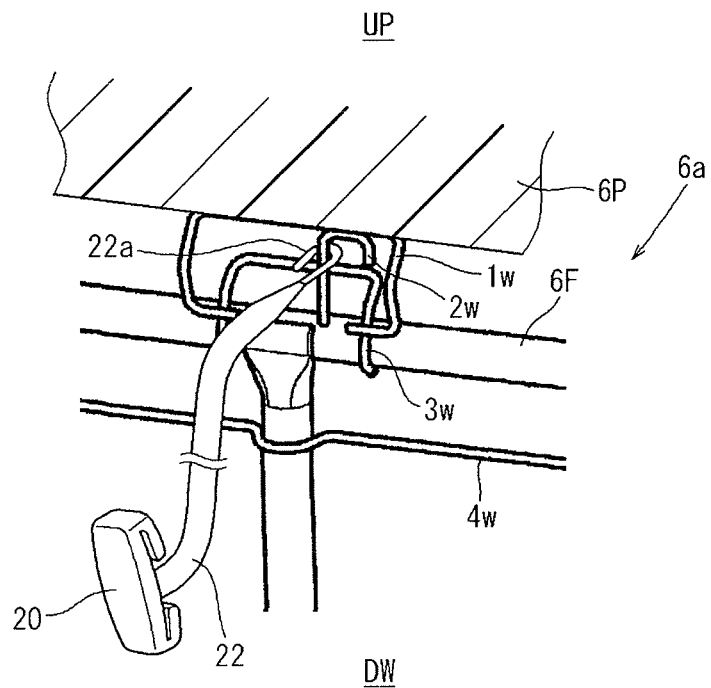
FIG. 5 is a partial perspective view of an internal configuration of the seat back.

Those seat constructional members include a frame member (6F or the like) that functions as a skeleton of the seat, a cushion member (6P or the like) that forms an outside shape of the seat, and a surface skin member (6S or the like) that covers the cushion member (see FIGS. 4 and 5).

Figure 2:
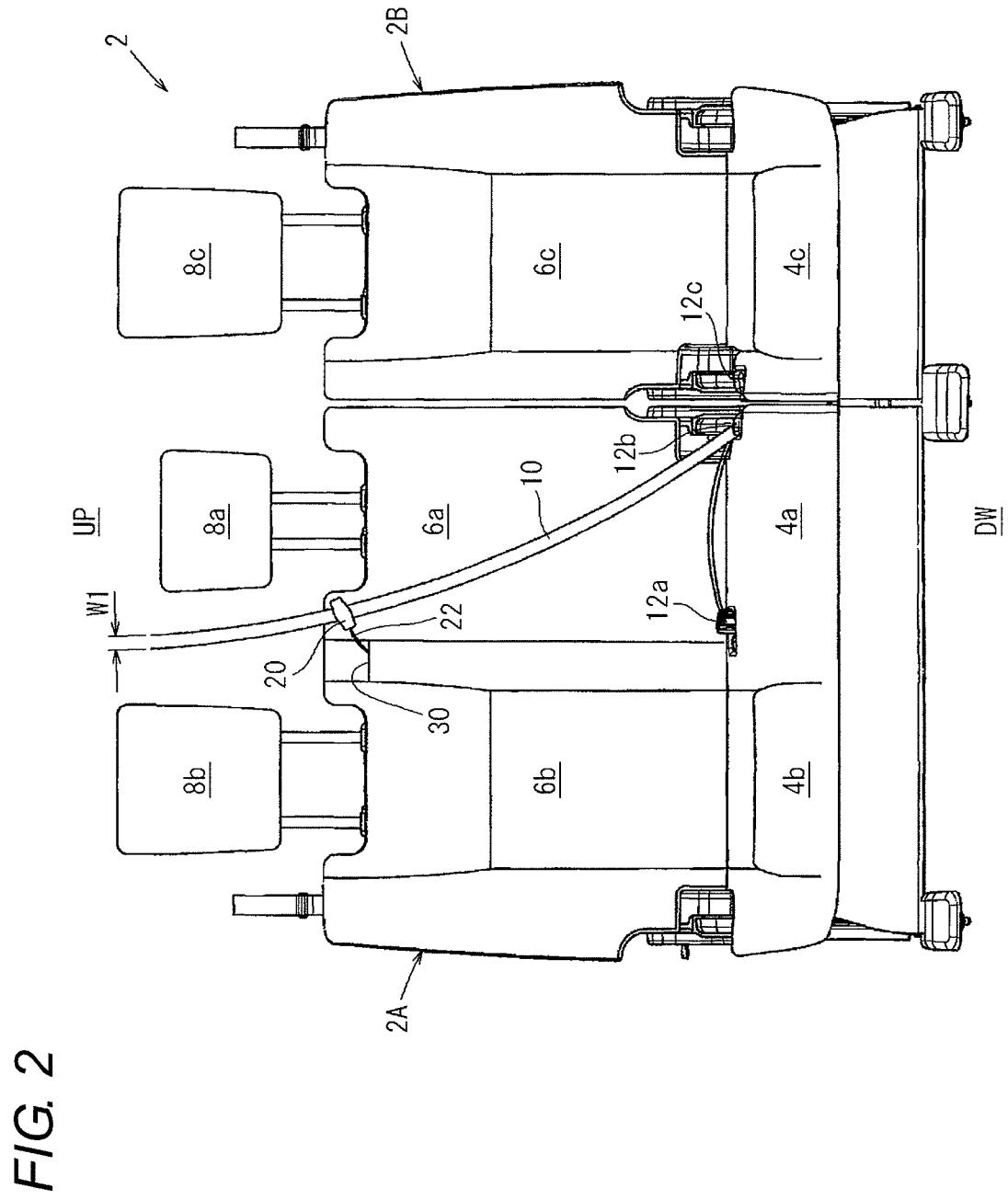
FIG. 2 is a front view of the vehicle seat.

In the present illustrative embodiment, a belt member 10 that is capable of restraining an occupant, and buckle members (12a to 12c) are provided appropriately to the seat sections 2A and 2B (see FIGS. 1 and 2).

For example, the buckle members (12a and 12b) are attached to both sides of the back portion of the seat cushion 4a. The belt member 10 is a band-shaped belt that is capable of restraining an occupant, and can be drawn from a structure that is disposed above the seat (e.g., a wall body, a ceiling, and a door unit of a vehicle interior).

Then, while being drawn, the belt member 10 is routed from the side of the seat back 6a to the side of the seat cushion 4a to be wound around the occupant (not shown). In this state, the belt member 10 is locked at a middle portion together with the buckle member 12b to further straddle the legs of the occupant, and an end portion of the belt member 10 is locked with the other buckle member 12a (i.e., three-point fixing).

In the present illustrative embodiment, a rerouter member 20 (described later) is appropriately taken out from a storage portion 30 (described later) of the seat back 6a depending on a body size or the like of the occupant, and a routing position of the belt member 10 is made changeable at a middle portion (see FIGS. 1 and 2).

In this configuration, it is desired to avoid deterioration of design of the seat as much as it can be, and to dispose the rerouter member 20 to have better usability.

Thus, the present illustrative embodiment is aiming at avoiding deterioration of design of the seat as much as it can be, and disposing the rerouter member 20 to have better usability. Hereinafter, detailed descriptions of constructional members will be provided taking a portion of the first seat section 2A (the seat cushion 4a and the seat back 6a) as an example.

[First Seat Section]

The first seat section includes the seat cushion 4a, the seat back 6a, and a reclining mechanism RM (see FIGS. 1 and 2).

The reclining mechanism RM is a mechanism configured to maintain a position of the seat back 6a with respect to the seat cushion 4a, and includes an axis unit 2r that extends in a width direction of the seat. In the present illustrative embodiment, the position of the seat back 6a can be switched among an upright position where the seat back 6a is uprighted with respect to the seat cushion 4a, a backward inclined position where the seat back 6a is inclined toward the back of the seat, and a forward inclined position where the seat back 6a is inclined toward the front of the seat by rotation movement of the seat back 6a about the axis unit 2r.

(Basic Configuration of the Seat Back)

Figure 3:
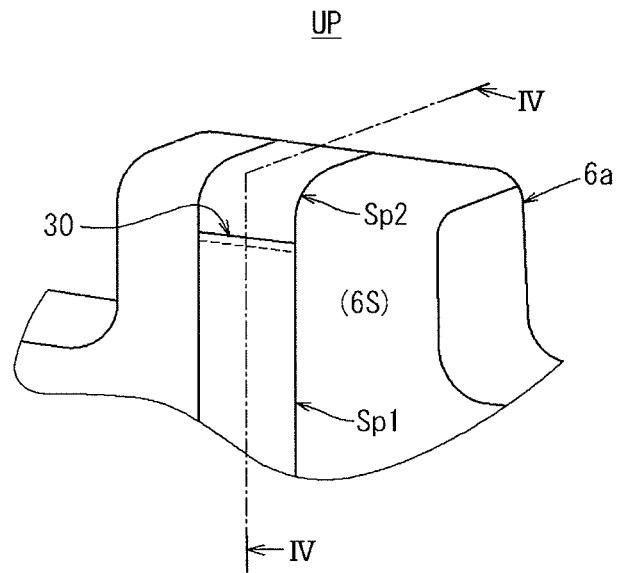
FIG. 3 is a partial perspective view of a seat back.

The surface skin member 6S can be made of a plurality of surface pieces (e.g., a first piece Sp1 to a fourth piece Sp4) that are sewn to be like a bag (see FIGS. 3 and 4).

The first piece Sp1 is a surface piece that covers a seating surface of the seat back 6a, and the fourth piece Sp4 is a surface piece that covers a back surface of the seat back 6a. The second piece Sp2 is a surface piece that covers an upper surface of the seat back 6a, and the third piece Sp3 is a surface piece that can be disposed below the second piece Sp2.

The frame member 6F is a member having an approximately rectangular (arch-shaped) frame shape, and includes a plurality of supporting wires (1w to 4w) (see FIG. 5).

The plurality of supporting wires (1w to 4w) are wire rods (typically made from metal) with which the cushion member 6P can be supported or other members can be attached.

For example, the first wire 1w is a wire rod that have an approximately rectangular shape, and is attached to an upper portion of the frame member 6F to be able to support the cushion member 6P (a shoulder portion).

Figure 6:
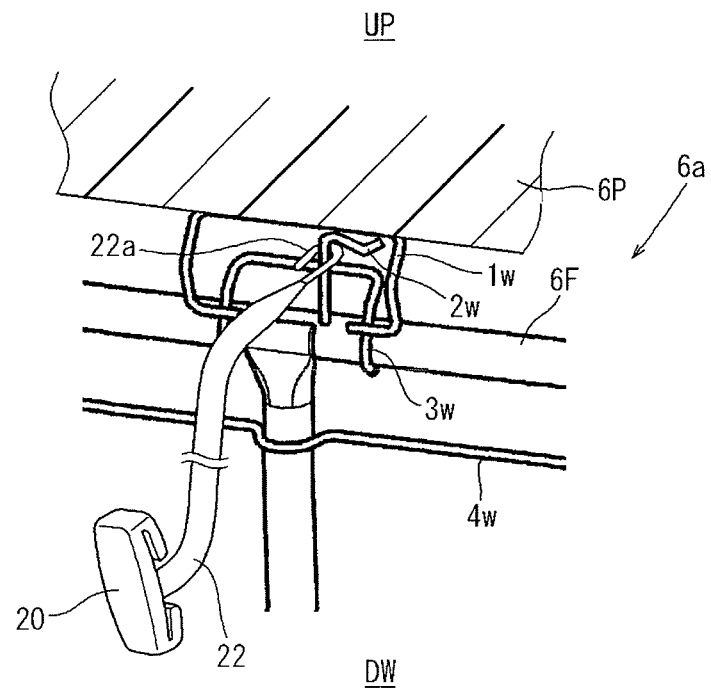
FIG. 6 is a partial perspective view of the internal configuration of the seat back according to a modified example.

The second wire 2w is a wire rod that has the shape of the approximate inverted letter J disposed close to the first wire 1w, and a base end side of the second wire 2w is attached to the upper portion of the frame member 6F while a free end side of the second wire 2w is bent downward. In the present illustrative embodiment, the second wire 2w and the first wire 1w are almost equal in height, and are able to support the cushion member 6P (the shoulder portion). A connecting member 22 (a locking section 22a; described later) can be locked with the second wire 2w. Incidentally, the second wire 2w may have different shape as shown in FIG. 6. In this modified example, the second wire 2w has the free end side with being bent downward.

[Rerouter Member]

The rerouter member 20 is a member capable of changing a routing position of the belt member 10 at a middle portion, and includes the connecting member 22 (see FIGS. 1, 2, 4 and 5).

The rerouter member 20 is a flat plate member having an approximately rectangular shape (when seen in a front view), and a size L1 in a longitudinal direction of the rerouter member 20 is set larger (longer) than a width W1 of the belt member 10. Then, both ends in the longitudinal direction of the rerouter member 20 are bent inward (in a direction such that both ends approach each other), and a portion at a middle portion of the belt member 10 can be inserted between (connected to) both ends of the rerouter member 20.

The connecting member 22 is a long wire member, and includes the locking section 22a having an approximately ring shape (a shape such that the second wire 2w can be inserted into) that is provided at one end of the connecting member 22.

In the present illustrative embodiment, the other end of the connecting member 22 is attached to the rerouter member 20. While the one end of the connecting member 22 (the locking section 22a) is locked inside of the seat, the rerouter member 20 is disposed such that the rerouter 20 can be inserted in and taken out from the storage unit 30 (described later).

[Storage Portion]

The storage portion 30 is a portion capable of storing a portion of the rerouter member 20, and includes a take-out opening 32 where the rerouter member 20 can be taken in and out (see FIGS. 1 to 4).

For example, the storage portion 30 (having a pocket shape) can be formed by the surface skin member 6S at the shoulder portion (on the seating surface side) of the seat back 6a. In the present illustrative embodiment, after the third piece Sp3 is sewn onto a lower portion of the second piece Sp2, a lower portion of the third piece Sp3 is sewn onto a middle portion of the first piece Sp1. In addition, lateral ends of the pieces Sp1 to Sp3 are sewn onto another surface piece that is not shown in the drawings, and thereby the storage portion 30 having a pocket shape can be formed. Then, a hole portion H that communicates with the inside of the seat is provided at a middle portion of the third piece Sp3, and the hole portion H is capable of guiding the connecting member 22 to the inside of the seat.

The take-out opening is formed between the first piece Sp1 and the second piece Sp2 to be open toward the upper portion of the seat. In the present illustrative embodiment, it is desired to sew the first piece Sp1 and the second piece Sp2 under tension (so as to look good). Thus, a tensile force is naturally applied in a direction that the first piece Sp1 and the second piece Sp2 approach each other (a direction that the take-out opening closes), and thereby a configuration can be provided such that the rerouter member 20 has an excellent retaining force.

In the present illustrative embodiment, by appropriately adjusting the sewing positions of the pieces Sp1 and Sp3, a storage size L2 (a size in an up/down direction) of the storage portion 30 can be set smaller (shorter) than the size L1 in the longitudinal direction of the rerouter member 20.

Further, by appropriately adjusting the sewing positions at the lateral ends of the pieces Sp1 to Sp3, the take-out opening can be made open larger than the size in a shorter direction of the rerouter member 20.

Thus, the storage portion 30 can store the rerouter member 20 while a portion of the rerouter member 20 is exposed (described later). It is noted that in the present illustrative embodiment, by appropriately adjusting the storage size L2 of the storage portion 30, the size capable of storing the rerouter member 20 is set larger than the size of the exposed portion of the rerouter member 20 (this is a configuration excellent in storage stability).

(Installation Operation of the Rerouter Member)

While the connecting member 22 is attached to the frame member 6F, the rerouter member 20 is disposed inside of the storage portion 30 referring to FIGS. 1, 4 and 5.

In the present illustrative embodiment, while being routed in the storage unit 30, the connecting member 22 is guided into the seat from the third piece Sp3 (the hole portion H) to be attached to the frame member 6F (the second wire 2w). At this time, the locking section 22a is inserted from the free end side of the second wire 2w to be guided to the base end side, and thereby the connecting member 22 can be attached to the second wire 2w. By disposing the cushion member 6P on the first wire 1w and the second wire 2w in this state, the cushion member 6P can prevent the locking section 22a from coming out to be detached from the second wire 2w (from moving toward the free end side).

Thus, while the connecting member 22 is attached to the frame member 6F, the rerouter member 20 is inserted into the storage portion 30 along the longitudinal direction of the rerouter member 20. At this time, because the storage size L2 of the storage portion 30 is smaller than the size L1 in the longitudinal direction of the rerouter member 20 in the preset illustrative embodiment, while a lower portion (a portion) of the rerouter member 20 can be stored inside of the storage portion 30, an upper portion (the other portion) of the rerouter member 20 is exposed to the outside of the seat from the take-out opening 32.

Thus, by partially exposing the rerouter member 20 while storing the rerouter member 20 inside of the storage portion 30, deterioration of design of the seat can be avoided as much as it can be, and the rerouter member 20 can be disposed to have better usability.

[Adjustment of the Routing Position of the Belt Member]

The rerouter member 20 is appropriately taken out from the storage portion 30 depending on a body size or the like of the occupant, and thereby the routing position of the belt member 10 is changed at a middle portion referring to FIGS. 1 and 2.

At this time, because the storage portion 30 is formed on the seating surface (the shoulder portion) of the seat back 6a in the present illustrative embodiment, the rerouter member 20 can be relatively quickly found. In addition, the rerouter member 20 can be taken out from the take-out opening provided on an upper portion of the storage portion 30 in a state where the seat back 6a is at the upright position (this is a configuration such that the rerouter member 20 is easily taken in and out).

Thus, according to the present illustrative embodiment, it is possible to avoid deterioration of design of the seat as much as it can be, and to dispose the rerouter member 20 to have better usability.

The vehicle seat according to the present illustrative embodiment is not limited to the configuration of the above-described illustrative embodiment, and can have a variety of other configurations.

(1) In the present illustrative embodiment, described as the example is the configuration (the position to be formed, the formed number, the shape, or the like) of the storage portion 30; however, the description is not intended to limit the configuration of this member. For example, the storage portion can be formed on a seating surface (a shoulder portion, the center, or a lateral end) of the seat, or on a side surface (a section easy to notice) of the seat, and can be formed also on a back surface of the seat. Further, it is also possible to form a plurality of storage portions in accordance with the number of rerouter member. Further, the take-out opening can be made appropriately open toward the upper portion of the seat, the lower portion of the seat, the lateral side of the seat, or the like.

Further, it is also possible to make the storage portion have a band shape (a shape that is open in an up/down direction), and attach both ends of the storage portion to the surface skin member. Then, while the rerouter member is held in a state where the rerouter member is inserted into the storage portion, the upper portion or the lower portion of the rerouter member can be exposed.

(2) In the present illustrative embodiment, described is the example that the rerouter member 20 is exposed from the take-out opening. Different from this configuration, it is also possible to expose a middle portion (another portion) of the rerouter member from a hole portion (a section that is different from the outlet) that may be provided at a middle portion of the storage portion.

(3) In the present illustrative embodiment, described is the example that the rerouter member 20 is inserted into the storage portion 30 from the longitudinal direction of the rerouter member 20. Different from this configuration, it is also possible that the rerouter member is inserted into the storage portion from the shorter direction of the rerouter member. In this configuration, a storage size (a size in a seat width direction) of the storage portion can be set smaller (shorter) than the size in the shorter direction of the rerouter member. In addition, the take-out opening is made openable larger than the size in the longitudinal direction of the rerouter member. Thus, by inserting the rerouter member into the storage portion from the shorter direction of the rerouter member, an end portion in the shorter direction of the rerouter member can be exposed to the outside.

(4) In the present illustrative embodiment, described as the example is the configuration (the shape, the size, or the like) of the rerouter member 20; however, the description is not intended to limit the configuration of this member. The shape and the size of the rerouter member can be appropriately changed in accordance with the configuration of the seat. In addition, the rerouter member can be connected to the belt member so as to be movable relative to the belt member, or can be connected to the belt member so as to be unmovable relative to the belt member.

Further, in the present illustrative embodiment, described as the example is the configuration that the connecting member 22 is latched together with the frame member 6F (the second wire); however, it is also possible that the connecting member 22 is attached to a variety of constructional members in the seat. In addition, the configuration of the locking section can be appropriately changed in accordance with the configuration of the seat.

(5) In the present illustrative embodiment, described exclusively as the example is the first seat section; however, the configuration according to the present illustrative embodiment can be applied also to the second seat section, so that the configuration according to the present illustrative embodiment can be applied also to a single-occupant vehicle seat.

Further, the constructional members of each seat section (a belt member, a buckle member or the like) can be changed appropriately.

What is claimed is:

1. A vehicle seat comprising:
   a seat cushion;
   a seat back connected to the seat cushion and including a storage portion that is defined by a cavity provided on the seat back;
   a belt member configured to restrain an occupant while the belt member is routed from a side of the seat back to a side of the seat cushion; and
   a rerouter member configured to be completely removed from the cavity when the belt member is routed therethrough to change a routing position of the belt member at a middle portion thereof,
   wherein in a state where a portion of the rerouter member is stored in the storage portion, another portion of the rerouter member is exposed from the storage portion.

2. The vehicle seat according to claim 1,
   wherein the storage portion is provided on a seating surface of the seat back.

3. The vehicle seat according to claim 1,
   wherein the storage portion is provided on a side surface of the seat back.

4. The vehicle seat according to claim 1,
   wherein the rerouter member is configured to be taken out from a take-out opening provided on an upper portion of the storage portion in a state where the seat back is at an upright position with respect to the seat cushion.

5. The vehicle seat according to claim 1,
   wherein the seat back includes a frame member, and
   wherein the rerouter member includes a connecting member which is locked to the frame member.

6. The vehicle seat according to claim 1,
   wherein the storage portion has a storage size which is smaller than a longitudinal direction of the rerouter member.

* * * * *